United States Patent
Yin et al.

(10) Patent No.: US 12,400,344 B2
(45) Date of Patent: Aug. 26, 2025

(54) CPR POSTURE EVALUATION MODEL AND SYSTEM

(71) Applicant: Xuanwu Hospital Capital Medical University, Beijing (CN)

(72) Inventors: Chunlin Yin, Beijing (CN); Fei Song, Beijing (CN); Ruirui Li, Beijing (CN); Zexing Ning, Beijing (CN); Yang Yuan, Beijing (CN); Chao Chen, Beijing (CN); Yajun Wang, Beijing (CN)

(73) Assignee: Xuanwu Hospital Capital Medical University, Beijing (CN)

( * ) Notice: Subject to any disclaimer, the term of this patent is extended or adjusted under 35 U.S.C. 154(b) by 354 days.

(21) Appl. No.: 18/159,443

(22) Filed: Jan. 25, 2023

(65) Prior Publication Data

US 2023/0237677 A1 Jul. 27, 2023

(30) Foreign Application Priority Data

Jan. 27, 2022 (CN) .......................... 202210103794.9
Dec. 15, 2022 (CN) .......................... 202211609750.X
(Continued)

(51) Int. Cl.
*G06T 7/292* (2017.01)
*G06T 7/246* (2017.01)
*G06T 7/73* (2017.01)

(52) U.S. Cl.
CPC .............. *G06T 7/292* (2017.01); *G06T 7/248* (2017.01); *G06T 7/74* (2017.01); *G06T 2207/30196* (2013.01)

(58) Field of Classification Search
CPC ...... G06V 20/653; G06V 40/10; G06V 10/40; G06V 2201/03; G06V 40/20; G06T 7/50;
(Continued)

(56) References Cited

U.S. PATENT DOCUMENTS

2015/0164339 A1 6/2015 Xu et al.
2015/0255005 A1* 9/2015 Yoda ....................... G06T 17/00
434/265

FOREIGN PATENT DOCUMENTS

CN 106096314 11/2016
CN 110990649 4/2020
(Continued)

OTHER PUBLICATIONS

Xie, Huosheng, et al. "A novel algorithm of fast CPR quality evaluation based on kinect." Journal of Algorithms & Computational Technology 14 (2020): 1748302620983661. (Year: 2020).*

*Primary Examiner* — Sumati Lefkowitz
*Assistant Examiner* — Connor L Hansen
(74) *Attorney, Agent, or Firm* — Smart & Biggar LP

(57) ABSTRACT

The present invention relates to a CPR posture monitoring model and system, the model being configured to: based on human skeleton point data extracted from CPR moves, at least compute arm-posture angle data and GC matching angle data related to the CPR moves, and determine whether the CPR moves are qualified by comparing arm-posture angle data and GC matching angle data to a CCP qualification threshold; wherein human skeleton point data are extracted from first move data collected by a first optical component and second move data collected by a second optical component simultaneously, wherein an included angle between collection directions of the two optical components ranges between 30 and 90 degrees. By constructing and applying a CPR posture monitoring model defined by data like GC matching angle, evaluation result has higher accuracy. Compared with the prior art where the equipment positions must be exactly the same as the equipment positions when the data are acquired for the AI algorithm to compute the CPR mistakes, the disclosed method does not require that the equipment positions must be exactly the
(Continued)

same as the equipment positions when collecting the data and could tolerate inaccuracy or error in the equipment positions, besides, the disclosed method could realize harmless quality control of CPR moves.

6 Claims, 10 Drawing Sheets

(30) Foreign Application Priority Data

Dec. 15, 2022 (CN) .......................... 202211638072.X
Dec. 15, 2022 (CN) .......................... 202211644861.4

(58) Field of Classification Search
CPC ......... G06T 19/003; G06T 2207/10016; G06T 7/174; G06T 7/292; G06T 2207/30196; G06T 7/20
See application file for complete search history.

(56) References Cited

FOREIGN PATENT DOCUMENTS

| | | |
|---|---|---|
| CN | 112233515 | 1/2021 |
| CN | 112233516 A | 1/2021 |
| CN | 114983791 A | 9/2022 |
| CN | 115350081 A | 11/2022 |
| WO | 2022196879 A1 | 9/2022 |

* cited by examiner

| parameter | percentile range (°) |
|---|---|
| left arm posture angle | 169.24-180 |
| right arm posture angle | 168.49-180 |
| center of gravity matching angle | 0-18.46 |

Fig.6

| actual value | estimation value | | | |
|---|---|---|---|---|
| | + | + | - | - |
| + | TP=962 | | | |
| - | | FP=388 | | |
| + | | | FN=238 | |
| - | | | | TN=5612 |

Fig.7

| parameter | value |
|---|---|
| accuracy | 91.31% |
| sensitivity | 80.16% |
| specificity | 93.53% |

Fig.8

| human keypoints | front camera | side camera |
| --- | --- | --- |
| nose | 0.92 | 0.89 |
| neck | 0.91 | 0.88 |
| right shoulder | 0.94 | 0.91 |
| right elbow | 0.89 | 0.87 |
| right wrist | 0.93 | 0.89 |
| left shoulder | 0.95 | 0.81 |
| left elbow | 0.90 | 0.90 |
| left wrist | 0.87 | 0.88 |
| right hip | 0.89 | 0.83 |
| right knee | 0.84 | 0.90 |
| right ankle | 0.67 | 0.93 |
| left hip | 0.87 | 0.86 |
| left knee | 0.68 | 0.82 |
| left ankle | 0.46 | 0.45 |
| right eye | 0.94 | 0.91 |
| left eye | 0.89 | 0.89 |
| right ear | 0.90 | 0.88 |
| left ear | 0.91 | 0.56 |

| | total number of frames (%) | number of frames of expert-group (%) | number of frames of non-expert-group (%) | $\chi^2$ | P value |
|---|---|---|---|---|---|
| exerting force with wrists | 43808 (52.73) | 33842 (53.00) | 9966 (52.00) | 5.39 | 0.02 |
| finger-chest contact | 43808 (52.73) | 33842 (53.00) | 9966 (52.00) | 5.39 | 0.02 |
| inclined simple GC bias | 29222 (35.18) | 17253 (27.00) | 11969 (62.40) | 8127.61 | 0.00 |
| GC moving laterally | 4068 (4.90) | 4068 (6.40) | 0 (0.00) | 1282.77 | 0.00 |
| GC moving back and forth | 5164 (6.22) | 5164 (8.10) | 0 (0.00) | 1651.28 | 0.00 |
| long pause | 1320 (1.59) | 1320 (2.10) | 0 (0.00) | 402.25 | 0.00 |
| bending elbows | 6831 (8.22) | 4821 (7.50) | 2010 (10.50) | 169.33 | 0.00 |
| wrong hand position | 2184 (2.63) | 0 (0.00) | 2184 (11.40) | 7479.28 | 0.00 |
| heel of palm being separated from the chest wall | 3859 (4.65) | 1849 (2.80) | 2010 (10.60) | 2047.92 | 0.00 |

Fig.11

CPR POSTURE EVALUATION MODEL AND SYSTEM

BACKGROUND OF THE INVENTION

1. Technical Field

The present invention relates to the technical field of CPR motion evaluation, and more particularly to a CPR posture evaluation model and system.

2. Description of Related Art

Once happening, cardiac arrest can cause irreversible damage to the brain and other vital organs in the human body and even endanger life in only 4 to 6 minutes. Cardiopulmonary resuscitation (CPR) is a crucial skill that improves chances of survival and recovery for victims of cardiac arrest. Therefore, we can say that high-quality CPR is the basis of basic life support and advanced life support. The quality of CPR is important because CPR not delivered with competent moves can prevent organs from getting sufficient perfusion and significantly reduce the success rate of resuscitation. Particularly, since the nervous system is quite sensitive to ischemia and hypoxia, even if circulation retunes after resuscitation, irreversible brain injury happened in many cases, seriously degrading the post-resuscitation quality of life of these patients. The first edition of guidelines for CPR was published in 1966 by the Ad Hoc Committee on Cardiopulmonary Resuscitation in the Division of Medical Sciences of the National Research Council at the US National Academy of Sciences. However, after more than fifty years since then, cardiac arrest is still been a primary threat to human life and health now. The continuous efforts paid to provide clear, followable standards in the guidelines to optimize CPR practice and thereby save lives are fruitful. Nevertheless, successful application of these indicators in CPR operation during first aid requires strict training and drill in addition to the written standards. Currently, effectiveness of CPR training in general depends on individual competence and subjective judgement of trainers. Without consistent, standardized criteria, training results are unmeasurable. Besides, it is difficult to deliver real-time feedback to trainees in human-instructed training, so the learning cycle is relatively long, leaving it an unmet need to accurately convert theoretical principles in the guidelines to learning of trainees.

To address this need, CPR manikins have been developed and extensively used. Such a manikin features built-in acceleration sensors that enable monitoring of compression moves according to key indicators, such as the frequency and the depth, excluding chest compression posture (CCP), which is left to subjective assessment made by human trainers without objective criteria to refer to. The correct posture ensures compression quality by enabling rescuers to exert force properly and protecting patients from additional injury. Particularly, in real-world CPR situations, providers tend to get tired after sustained CPR operation, and keeping correct compression posture is helpful to prolong the time before degradation of compression quality caused by fatigue of CPR providers. More importantly, correct compression posture is the prerequisite to accurate compression. According to some literatures, the posture of a CPR provider is highly influencing on chest compression in terms of depth and frequency. Nevertheless, studies focused on CCP are scarce.

In these few studies about CCP, there is a common conclusion-incorrect compression posture can undermine compression quality and accelerate operational fatigue. According to the finding of one of the studies found, a young healthy medical student performed CPR with degraded compression quality after continuously performing compression for 2 minutes, yet compression in the real world usually has to be maintained longer. It is thus clear that correct compression posture is the groundwork and key influencing factor of high-quality CPR.

Currently, for CPR, postural correction completely replies on individual competence and subjective judgement of trainers, making consistent measurement unachievable. Meanwhile, trainees apprehend what correct posture is through demonstration and oral summary made by trainer, so the process is less intuitive and less efficient. At last, it is unrealistic to expect a trainer not to miss any move throughout CPR operation of a trainer. In view of the issues of the prior art, our study is aimed at developing a novel dual-stereo-camera CCP monitoring model that address the shortcomings of the existing devices. As proven in our study, the model-guided procedure more accurately recognized key CCP mistakes: bending arms and GC (the center of gravity) mismatching. Additionally, opposite to human trainers, the model-guided procedure can automatically monitor and analyze compression posture in every move in a real-time manner and generate a conclusive report, thus giving a more objective and comprehensive postural review. Moreover, the model delivers assessment results intuitively through images, so as to facilitate understanding of trainees and reduce the learning cycle, thereby saving time and labor costs.

There is unavoidably a gap between knowing theoretical CPR knowledge and correctly implementing the operation, and quality control against well-designed CPR indicators is helpful for trainees to focus on and master operating points. Some quality control approaches have been proposed in relevant researches, such as those employing pressure sensors, accelerometers, force sensors, impedance signal, and motion detection; commercialized manikins having built-in acceleration sensors; Kinect-based quality control focused on the depth and frequency of compression; and compression sensors that have been used clinically in the recent years. Among the relatively view studies about CPR posture, that conducted by Karolina et al. set a great direction. In the prior research, arm angles during compression, as a basis of CCP assessment, were detected using probes directly adhered to the skin, which is the same key CCP indicator as recognized by inventors of the present invention, but the prior research provided no criteria for acceptance. While straight arms and proper GC placement are the two CCP points commonly acknowledged in literatures and the latest guidelines, there is not a set of quantitative criteria for measurement. A recent study about application of multi-modal systems in CPR monitoring also placed its focus on postural measurement. In the study, multi-channel signals are collected using Kinect cameras and electromyography sleeves simultaneously, so as to enable smart analysis of arm angles and variations of the center of gravity during compression. However, the study has its limitation. That is, the used devices have to be arranged consistently, or the results cannot be applied generally. For example, if the Kinect system is moved to another position, the values obtained by the sensors may have significant variations, or if a sensor is added to or removed from the Kinect system, the current algorithm may be no more applicable. Differently, the present invention first extracts skeleton point data of a CPR provider using a smart algorithm, and then compares the data to a preset qualification range, making the resulting independent of the positions of devices. Furthermore, use of the model of the present invention does not involve any device for trainees to wear and is independent of other devices, making the model more convenient, versatile and compatible than any prior-art device, and highly promising in terms of future application.

Moreover, while most of the existing human skeleton extraction algorithms are based on the natural standing position or positions in specific motions, there is not a skeleton extraction algorithm specific to CPR, whose performance requires the provider to be in the kneeling position. A proper skeleton extraction algorithm plays an important role in connecting CPR to artificial intelligence (AI) technologies for subsequent analysis and application, yet the prior art has to make do with these skeleton extraction algorithms not designed for CPR moves. To address the technical need, in the present invention, a skeleton extraction algorithm for recognizing CPR moves is developed to determine a CCP qualification threshold. The present invention further provides a CPR automatic feedback assessment model as well as a CPR automatic assessment model quality control method and its system.

The present invention is thus superior to the existing approaches in the art. For example, China Patent CN106096314A discloses a CPR training and assessment system, which comprises: a CPR compression model, for giving a positive response as feedback for every effective compression; and a mobile terminal, for acquiring information of the positive response and obtaining an assessment result. The prior patent further provides a CPR training method, comprising the following steps: a mobile terminal gives CPR training beats for a trainee to follow when performing compression on the CPR compression model; the CPR compression model gives a positive response as feedback for every effective compression; the mobile terminal acquires information of the positive response; the mobile terminal receives an assessment result; and the mobile terminal outputs the training result. It is obvious that the known CPR training and assessment system can only detect and assess compression results after CPR moves and provides no information about whether and for how long the posture of the CPR provider during these CPR moves remains correct.

As another example, China Patent CN112233515A discloses an unmanned examination and intelligent scoring method applied to physician CPR examination, comprising: S1: setting examination stages, assessment key points of the examination stages and a scoring standard corresponding to the assessment key points, wherein the examination stages include a pre-operation preparation stage, an in-operation stage, and a post-operation assessment stage; S2, collecting video and audio data of operation actions of an examinee and uploading the data to a server; S3: sending the video and audio data received by the server to an AI intelligent scoring system, and intelligently scoring the actions and the audio of the examinee according to scoring criteria set for the assessment key points; and S4: pushing an assessment result by the server to a display for displaying. While the prior-art method is useful in giving information about arm verticality, hand-chest contact, back bending, shoulder-wrist synchronicity, and arm verticality criteria, no reference is provided for the GC angle of the CPR provider, making well-informed determination of whether a CPR move is qualified according to the CCP central angle impossible.

The known CPR assessment apparatus as described achieves postural recognition at its processor using a trained model. However, the recognition system built on such a model can only collect postural data at predetermined angles, and any angular deviation can degrade accuracy of recognition. This binds the known apparatus to operation of skilled users and precise arrangement of collecting ends, significantly limiting its applications. It is the objective of the present invention to provide a computing model capable of CCP recognition without using a training model, so that even if device arrangement at the collecting end has any angular deviation, accurate recognition and assessment can be ensured through computing.

Since there is certainly discrepancy between the prior art comprehended by the applicant of this patent application and that known by the patent examiners and since there are many details and disclosures disclosed in literatures and patent documents that have been referred by the applicant during creation of the present invention not exhaustively recited here, it is to be noted that the present invention shall actually include technical features of all of these prior-art works, and the applicant reserves the right to supplement the application with the related art more existing technical features as support according to relevant regulations.

SUMMARY OF THE INVENTION

In view of the shortcomings of the prior art, the present invention provides a method for determining a CCP qualification threshold, comprising: simultaneously capturing, with a first optical component and a second optical component, images of CPR moves of a CPR provider at different collection directions, respectively, extracting human skeleton point data from the first move data collected by the first optical component and the second move data collected by the second optical component and at least computing arm-posture angle data and GC matching angle data related to the CPR moves, determining a reasonable range of the arm-posture angle data and a reasonable range of the GC matching angle data according to one-sided skewed distribution patterns of arm-posture angle data and GC matching angle data of plural qualified CPR moves.

Preferably, the method further comprises: determining the reasonable range of the arm-posture angle data based on a 5th percentile in a one-sided skewed distribution pattern of the arm-posture angle data, and determining the reasonable range of the GC matching angle data based on a 95th percentile in a one-sided skewed distribution pattern of the GC matching angle data.

Preferably, an included angle between the collection directions of the first optical component and the second optical component ranges between 30 and 90 degrees.

Preferably, the included angle between the collection directions of the first and second optical components is 45 degrees, wherein the first optical component collects the first move data at the first collection direction, wherein the first optical component faces a body front of the CPR provider; and wherein the second optical component collects the second move data at the second collection direction.

Preferably, the arm-posture angle data and the GC matching angle data are obtained by analyzing the CPR moves according to line segments as links between human skeleton points of the CPR provider, wherein the arm-posture angle data relate to a right arm posture angle and a left arm posture angle, wherein the right arm posture angle is defined by a link between the skeleton points respectively corresponding to a right shoulder, a right elbow joint and a right wrist; and the left arm posture angle is defined by a link between the skeleton points respectively corresponding to a left shoulder, a left elbow joint and a left wrist; and wherein the GC matching angle data relate to a GC matching angle, which is an included angle between a direction in which a GC of the CPR provider moves and a normal vector to a plane.

Preferably, the arm-posture angle data and the GC matching angle data of plural qualified CPR moves are selected at least by: selecting the arm-posture angle data and GC matching angle data each reaching a predetermined confidence level; and commenting the CPR moves based on different indicators by the at least one CPR expert, and selecting the arm-posture angle data and GC matching angle data of the CPR moves commented as qualified for distribution statistics.

The present invention further provides a CPR assessment model, being configured to: based on human skeleton point data extracted from CPR moves performed by a CPR provider, at least compute arm-posture angle data and GC matching angle data related to the CPR moves, and determine whether the CPR moves are qualified by comparing the arm-posture angle data and the GC matching angle data to a CCP qualification threshold; wherein the human skeleton point data are obtained from first move data related to the CPR moves collected by a first optical component and second move data related to the CPR moves collected by a second optical component simultaneously, and wherein the first optical component and the second optical component collect the move data in different collection directions, and an included angle between the collection directions ranges between 30 and 90 degrees.

Preferably, the arm-posture angle data and the GC matching angle data are obtained by analyzing the CPR moves according to line segments as links between human skeleton points of the CPR provider, wherein the arm-posture angle data relate to a right arm posture angle and a left arm posture angle, wherein the right arm posture angle is defined by a link between the skeleton points respectively corresponding to a right shoulder, a right elbow joint and a right wrist, and the left arm posture angle is defined by a link between the skeleton points respectively corresponding to a left shoulder, a left elbow joint and a left wrist, and the GC matching angle data relate to a GC matching angle, which is an included angle between a direction in which a GC of the CPR provider moves and a normal vector to a plane; and the CCP qualification threshold at least includes a reasonable left arm angle range between 169.24° and 180°, a reasonable right arm angle range between 168.49° and 180°, and a reasonable GC matching angle range between 0° and 18.46°.

Preferably, the CCP qualification threshold is determined at least by: determining a reasonable range of the arm-posture angle data and a reasonable range of the GC matching angle data according to one-sided skewed distribution patterns of arm-posture angle data and GC matching angle data of plural qualified CPR moves; and determining the reasonable range of the arm-posture angle data based on a 5th percentile in a one-sided skewed distribution pattern of the arm-posture angle data, and determining the reasonable range of the GC matching angle data based on a 95th percentile in a one-sided skewed distribution pattern of the GC matching angle data.

Preferably, when the CPR assessment model receives compression data fed back by a manikin about the CPR moves, and the compression data are in temporal alignment with the CPR moves, the CPR assessment model determines whether the CPR moves are qualified according to the CCP qualification threshold, indicator-based comments made by at least one CPR expert on the CPR moves, and/or a CCP qualification threshold set by at least one CPR expert.

The present invention also provides an automatic CPR quality control system, at least comprising:
  a first optical component, for collecting first move data related to CPR moves of a CPR provider in a first collection direction;
  a second optical component, for collecting second move data related to the CPR moves in a second collection direction that is different from the first collection direction, wherein an included angle between the first optical component and the second optical component having the different collection directions ranges between 30 and 90 degrees;
  a processor, for, when the CPR moves collected from at least two angles by the first optical component are in alignment, computing arm posture angle data and GC matching angle data defined by human skeleton points of the CPR provider based on the first and the second move data, and determining whether the CPR moves are qualified against a CCP qualification threshold according to the arm-posture angle data and the GC matching angle data; and
  a terminal, for receiving a message sent by the processor indicating that the CPR moves are qualified when the arm-posture angle data and the GC matching angle data are both qualified.

Preferably, the CCP qualification threshold at least includes a reasonable left arm angle range between 169.24° and 180°, a reasonable right arm angle range between 168.49° and 180°, and a reasonable GC matching angle range between 0° and 18.46°.

Preferably, the arm-posture angle data and the GC matching angle data are obtained by analyzing the CPR moves according to line segments as links between human skeleton points of the CPR provider, wherein the arm-posture angle data relate to a right arm posture angle and a left arm posture angle, wherein the right arm posture angle is defined by a link between the skeleton points respectively corresponding to a right shoulder, a right elbow joint and a right wrist, and the left arm posture angle is defined by a link between the skeleton points respectively corresponding to a left shoulder, a left elbow joint and a left wrist, and the GC matching angle data relate to a GC matching angle, which is an included angle between a direction in which a GC of the CPR provider moves and a normal vector to a plane.

Preferably, the processor at least comprises: a data extraction module, for extracting human skeleton point data from the first move data related to the CPR moves collected by a first optical component and the second move data related to the CPR moves collected by a second optical component simultaneously; a pre-processing module, for pre-processing the skeleton point data through missing value analysis, outlier analysis, data cleaning, feature selection and/or data transformation; and a posture assessment module, for computing the pre-processed skeleton point data based on the CPR assessment model so as to obtain arm-posture angle data and GC matching angle data, and determining whether the CPR moves are qualified at least against a CCP qualification threshold.

Preferably, the system further comprises an optimization module, wherein the optimization module has a 3D moving point model built with qualified CPR moves performed by a CPR expert, and when receiving 2D posture estimation information based on the CPR move data collected by the first optical component and/or the second optical component, the optimization module uses the 3D moving point model to transform 3D CPR move data into 2D CPR move data, and the processor sends the 2D posture estimation information to a CPR assessment model to generate a first analysis result, and wherein the optimization module inputs the 2D CPR move data to the CPR assessment model to generate a second analysis result that is then sent to the processor, and when the first analysis result and the second analysis result are different, the processor optimize the CPR assessment model against the second analysis result.

BRIEF DESCRIPTION OF THE DRAWINGS

FIG. 6 provides an example of qualified postural ranges of CPR moves according to one embodiment of the present invention;

FIG. 7 shows performance data of the CPR posture monitoring model of the present invention in an experimental test;

FIG. 8 shows an example of assessment parameters of the CPR posture monitoring model of the present invention;

FIG. 11 provides statistics of common CCP mistakes and rates thereof according to the present invention;

DETAILED DESCRIPTION OF THE INVENTION

The present invention will be further detailed with reference to the accompanying drawings. The present invention relates to a CPR posture monitoring model and an automatic CPR posture assessment apparatus. The present invention further involves building process of the CPR posture monitoring model. The present invention further provides a method for optimizing the CPR posture monitoring model.

Figure 12:
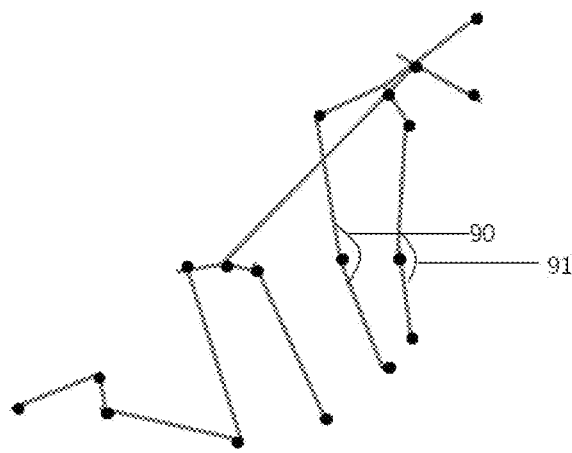
FIG. 12 is a schematic drawing showing angles of two arms of a PCR provider according to the present invention.

In the present invention, the term "arm angle" refers to the bending angle between the upper arm and the forearm of either arm of a CPR provider, as shown in FIG. 12.

Figures 9, 10:
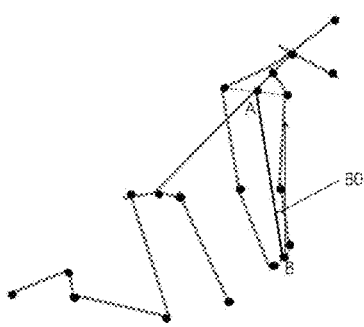
FIG. 9 provides statistics of confidence levels of coordinates of skeleton points according to the present invention.
FIG. 10 is a schematic drawing showing a GC matching angle of CPR posture according to the present invention.

The term "GC matching angle" refers to an included angle between the GC travel direction of a CPR provider and the normal vector to a plane. As shown in FIG. 10, the midpoint A of the link between the right shoulder 2 and the left shoulder 5 moves toward the midpoint B of the link between the right wrist 4 and the left wrist 7, generating a vector $\overline{AB}$. The included angle between the vector $\overline{AB}$ and the normal vector to a plane is the GC matching angle 80.

While straight arms and proper GC placement are the two CCP points commonly acknowledged in literatures and the latest guidelines, there is not a set of quantitative criteria for measurement. In CPR operation, compression is to be performed about 100 times per minute, or twice per 1000 ms, which is quite strength-consuming. Correct compression posture is the prerequisite to accurate compression. Some past CCP studies generate the same conclusion-incorrect compression posture can undermine compression quality and accelerate operational fatigue. According to the finding of one of the studies found, a young, healthy medical student performed CPR with degraded compression quality after continuously performing compression for 2 minutes, yet compression in the real world usually has to be maintained longer. It is thus clear that correct compression posture is the groundwork and key influencing factor of high-quality CPR.

Traditionally, CPR posture assessment does not give objective consideration to GC shift over time. Even if a CPR provider has qualified arm data, it is still possible that his/her GC shifts excessively to shorten his/her persistence and decrease remedial effectiveness of his/her CPR operation. Hence, how to objectively extract and quantify GC data of CPR moves is a technical issue unaddressed in the prior art. Also, how to monitor CPR posture according to objective data without human instruction is a technical issue unaddressed in the prior art. How to provide an accurate CPR posture monitoring model without involving AI learning is another technical issue unaddressed in the prior art.

Embodiment 1

The present embodiment relates to a method for determining a CCP qualification threshold as well as a method for building a CPR posture monitoring model and a CPR posture assessment apparatus.

While most of the existing human skeleton extraction algorithms are based on the natural standing position or positions in specific motions, there is not a skeleton extraction algorithm specific to CPR, whose performance requires the provider to be in the kneeling position. A proper skeleton extraction algorithm plays an important role in connecting CPR to AI technologies for subsequent analysis and application, yet the prior art has to make do with these skeleton extraction algorithms not designed for CPR moves. Therefore, the present invention provides a compression posture qualification threshold for assessing CPR moves and a method for determining the threshold. Based on the method for determining the CCP qualification threshold, a CPR posture monitoring model can be built and used in CPR training and real-word CPR operation.

In use, CPR move images are collected using optical components capable of capturing images and sent to a processor equipped with a CPR posture monitoring model, where skeleton point data extracted from the captured CPR moves can be converted to values in a real-time manner and analyzed to give an analysis result indicating whether the CPR posture is qualified. The present invention further uses the CPR posture monitoring model to generate recommendations on how to improve the CPR moves, so that even a person not having CPR skills can provide CPR in an emergency for first aid.

Figure 1:
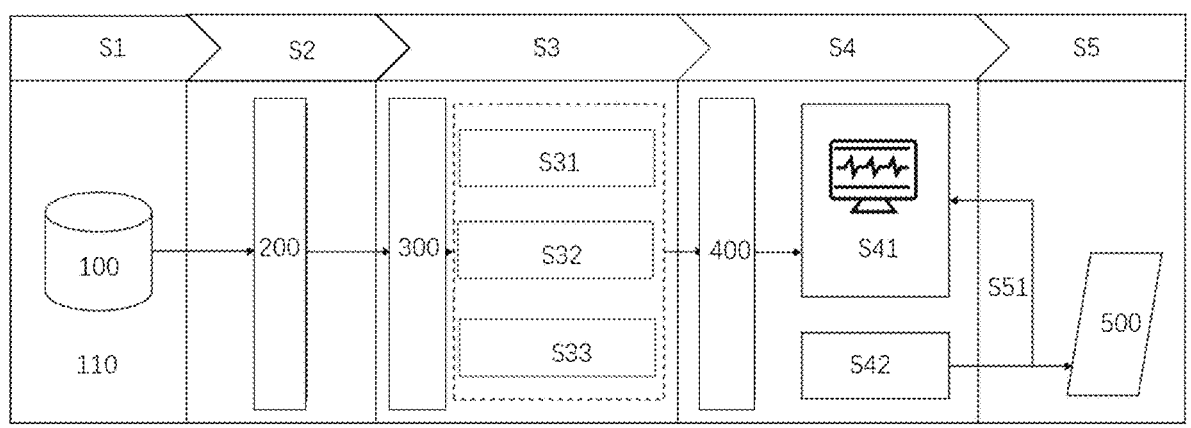
FIG. 1 shows simplified modular connection of an automatic CPR posture assessment apparatus according to one embodiment of the present invention.

As shown in FIG. 1, an apparatus for building the CPR posture monitoring model at least comprises a collecting end 100, a processor, and a receiving terminal. The processor is in wired or wireless connection with the collecting end 100 and the receiving terminal for data transmission. The collecting end 100, the processor, and the receiving terminal are respectively provided with an independent power line for power supply.

The collecting end 100 comprises a first optical component and a second optical component. The first optical component collects first move information about CPR posture with a first coordinate system. The first coordinate system is a reference coordinate system. The second optical component collects second move information about CPR posture with a second coordinate system. The first coordinate system and the second coordinate system are different. The first optical component collects first reference information about a CPR provider with the first coordinate system. The second optical component collects second reference information about the CPR provider with the second coordinate system.

Preferably, the first optical component and the second optical component collect dynamic images of CPR posture simultaneously from different angles. Preferably, the included angle between the collect directions of the first and second optical components is 45 degrees. Preferably, instead of 45 degrees, the included angle between the collect directions of the first and second optical components may alternatively be 30 degrees, 60 degrees, or so. Preferably, the included angle between the collect directions of the first and second optical components ranges between 30 and 90 degrees. However, if the included angle between the collect directions of the first and second optical components is 90 degrees and causes one of the optical components to capture images from the lateral of the CPR provider, capture of the GC shifting vector of the CPR provider tends to be ineffective. Therefore, the included angle between the collect directions of the first and second optical components is preferably smaller than 90 degrees.

Preferably, the first optical component collects the first move data at a collection direction of 0 degree with respect to the front of the CPR provider, or to say, the first optical component takes images of CPR moves right at the front of the CPR provider. The second optical component collects the second move data at a collection direction of 45 degrees laterally with respect to the front of the CPR provider. According to the skeleton point data collected by the first optical component, arm-posture angle data can be generated. According to the skeleton point data collected by the second optical component, GC matching angle data can be generated.

Alternatively, in another embodiment, degrees with respect to the front of the CPR provider, the first optical component shoots at a 45-degree angle laterally, and the second optical component shoots at a 0-degree angle. In this case, the GC matching angle data are generated from the skeleton point data collected by the first optical component, and the arm-posture angle data are generated from the skeleton point data collected by the second optical component.

The first optical component at least comprises a camera component and a computing component. The second optical component at least comprises a camera component and a computing component. The camera component may be, for example, a ZED camera apparatus 110. The computing component comprises a data extraction module 200, which is configured to extract, using an algorithm named Alpha-Pose, the human skeleton point data from the CPR move images collected by the camera component. The skeleton point data comprises features of skeleton line segment 60 formed by skeleton points and skeleton endpoints 61. The data extraction module 200 sends the skeleton point data to a processor. The data extraction module 200 is a computing device capable of running AlphaPose and has an application-specific integrated chip therein. The data extraction module 200 is connected to the camera component through a transmission cable for receiving the image data for subsequent processing. The data extraction module 200 is connected to the processor thorough a data bus, so as to extract the skeleton point data from the image data and send the image data to the processor.

Preferably, in another embodiment of the present invention, the data extraction module 200 may alternatively form a part of the processor instead of being built in the optical component.

Figure 2:
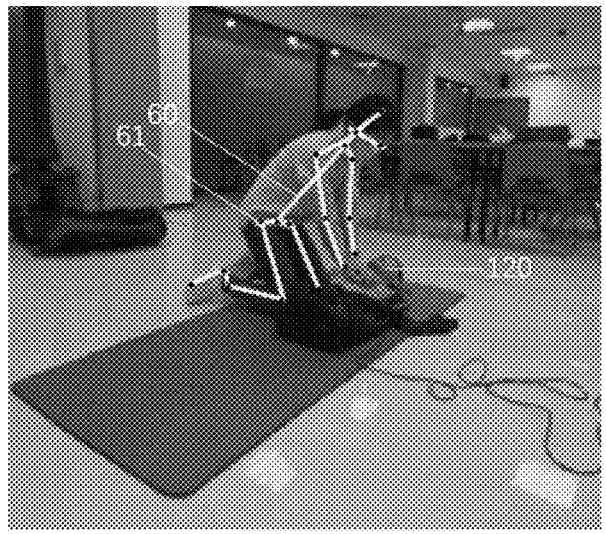
FIG. 2 illustrates extraction of skeleton points during a CPR move according to one embodiment of the present invention.

As shown in FIG. 2, when a CPR provider performs CPR operation, the data extraction module 200 extracts time-associated skeleton endpoints 61 and skeleton line segments 60 of the CPR provider.

Figure 3:
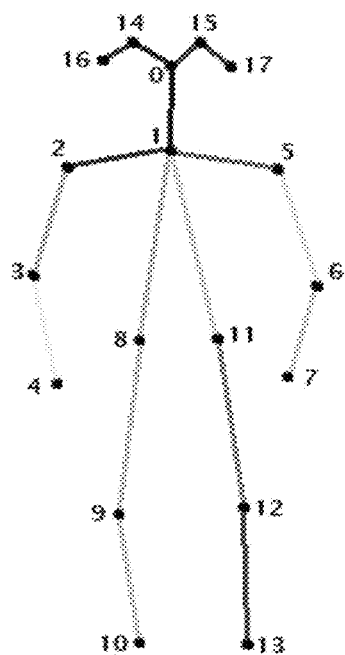
FIG. 3 is a schematic drawing showing AlphaPose-based human key points according to one embodiment of the present invention.

As shown in FIG. 3, the skeleton points extracted by the data extraction module 200 at least involve 18 main body parts. The skeletons points mainly include the nose 0, the neck 1, the right shoulder 2, the right elbow joint 3, the right wrist 4, the left shoulder 5, the left elbow 6, the left wrist 7, the right hip 8, the right knee 9, the right ankle 10, the left hip 11, the left knee 12, the left ankle 13, the right eye 14, the left eye 13, the right ear 16, and the left ear 17.

The data extraction module 200 further computes confidence levels of the skeleton point data. FIG. 9 provides statistical data of average confidence levels of individual skeleton points collected by the first optical component and the second optical component.

The data extraction modules 200 of the two optical components send the skeleton data they extract to the processor, respectively. The processor may be a server, a remote server, or an application-specific integrated chip. The processor serves to analyze the pre-processed skeleton point data and generate statistics. Alternatively, the processor may be a composite apparatus formed by at least two application-specific integrated chips or CPU processors. Alternatively, the processor may be a separate application-specific integrated chip or CPU capable of running the program of a data pre-processing module and the program of a posture assessment module. The application-specific integrated chip or the CPU may be implemented as a server or a cloud server.

The processor at least comprises a pre-processing module 300 and a posture assessment module 400. Therein, the pre-processing module 300 and the posture assessment module 400 may each be a separate hardware module of an application-specific integrated chip or a CPU. Where the pre-processing module 300 and the posture assessment module 400 are integrated in a single application-specific integrated chip or CPU, the pre-processing module 300 and the posture assessment module 400 can be executable programs while using the processor as a hardware carrier.

The processor is further equipped with a first data transmission port and a second data transmission port. Where the pre-processing module 300 and the posture assessment module 400 are each a hardware module in an application-specific integrated chip or a CPU, the pre-processing module 300 is connected to the first data transmission port through a data transmission cable. The pre-processing module 300 is connected to the posture assessment module 400 through a data transmission cable. The posture assessment module 400 is connected to the second data transmission port through a data transmission cable. The first data transmission port and the second data transmission port may each be a wired data transmission port component, or a wireless data transmission port component, depending on the selection of data transmission means. The wired data transmission port component may be, for example, any type of USB transmission cable ports. The wireless data transmission port component may be, for example, a Bluetooth-enabled communication component, a Wi-Fi-enabled communication component, a ZigBee-enabled communication component or the like.

Alternatively, the processor may use a single data transmission port connected to the pre-processing module 300 and the posture assessment module 400 in parallel, so as to send and receive data to and from the pre-processing module 300 and the posture assessment module 400, respectively.

Preferably, the pre-processing module 300 further pre-processes the skeleton point data it receives. The data pre-processing at least comprises:
S31: analysis of the data for missing values and outliers;
S32: data cleaning;
S33: feature selection; and
S34: data transformation.

The pre-processing module 300 then sends the pre-processed data to the posture assessment module 400 through the transmission cable. Preferably, the posture assessment module 400 can run the posture monitoring model. The posture monitoring model can compute arm-posture angle data and GC matching angle data.

The posture assessment module 400 is configured to:
S41: build a posture monitoring model; and
S42: assess the posture monitoring model.

The posture assessment module 400 at least computes arm-posture angle data of the two arms of the CPR provider based on the skeleton point data collected by the first optical component. Specifically, the skeleton point data collected by the first optical component at least include the right shoulder 2, the right elbow joint 3, the right wrist 4, the left shoulder 5, the left elbow 6, and the left wrist 7. As shown in FIG. 9, the confidence level of the right shoulder 2, the right elbow joint 3, the right wrist 4, the left shoulder 5, the left elbow 6, and the left wrist 7 are 0.94, 0.89, 0.93, 0.95, 0.90, and 0.87, respectively. The arm posture angle is the angle formed by the hand, the elbow, and the shoulder at the same side of the CPR provider. In other words, the right arm posture angle is the angle formed among the right shoulder 2, the right elbow joint 3, and the right wrist 4, and the left arm posture angle is the angle formed among the left shoulder 5, the left elbow 6, and the left wrist 7.

The posture assessment module 400 at least computes GC matching angle data of the CPR provider based on the skeleton point data collected by the second optical component. Herein, the skeleton point data at least include the right shoulder 2, the left shoulder 5, the right wrist 4, and the left wrist 7. As shown in FIG. 9, the confidence levels of the skeleton point data of the right shoulder 2, the left shoulder 5, the right wrist 4, and the left wrist 7 are 0.91, 0.81, 0.89, and 0.88 respectively. The GC matching angle is an included angle between the travel direction of the center of gravity of the CPR provider and a direction perpendicular to the patient lying on the ground. As shown in FIG. 10, the midpoint A of the link between the right shoulder 2 and the left shoulder 5 moves toward the midpoint B of the link between the right wrist 4 and the left wrist 7, so a vector $\overrightarrow{AB}$ is generated. The angle included by the vector $\overrightarrow{AB}$ and the plane normal vector is the GC matching angle 80.

The posture assessment module 400, based on a preset equation for computing the included angle as shown below, computes the included angle formed by the skeleton line segments, or the included angle between the vector and the normal vector:

$$\tan\theta = \left|\frac{m_2 - m_1}{1 + (m_2 * m_1)}\right|,$$

where $m_1$ represents the slope of the first straight line, and $m_2$ represents the slope of the second straight line, and
if the first straight line is defined by points $P_1=[x_1, y_1]$ and $P_2=[x_2, y_2]$,
the slope m is determined by the equation:

$$m = \frac{y_2 - y_1}{x_2 - x_1 + \varepsilon},$$

where $\varepsilon$ is $10^{-9}$.

In the prior art, CPR postural monitoring has been discussed in recent researches about applications of multimodal systems in CPR operation. In this prior research, multi-channel signals were collected from Kinect cameras and wearable electromyography sleeves simultaneously, and a smart algorithm was built for monitoring arm posture and GC variations during compression. However, this prior research has major limitation because it relies on a black-box algorithm obtained through machine learning, and the device arrangement has to be consistence for the results to be applied generally. For example, if the Kinect system is moved to another position, the values obtained by the sensors may have significant variations, or if a sensor is added to or removed from the Kinect system, the current algorithm may be no more applicable. Differently, the present invention first extracts skeleton point data of a CPR provider using a smart algorithm, and then compares the data to a preset qualification range, making the resulting independent of the positions of devices. In the present invention, the detection parameters are the arm posture angles of the two arms of the CPR provider and the GC matching angle. With the combination of AI and statistics, consistent and reproducible results can be obtained across experiments and applications as long as variations of the arrangement of cameras in terms of angle and distance are controlled in a specified range. Moreover, the prior multimodal research only used one camera to collect data of compression posture of CPR providers and provides no information about the distance and angle of the camera with respect to the CPR providers. Our experiments taught that blind zones came with the use of a single camera and to collect data of compression posture more accurately, at least two shooting angles have to be used simultaneously. Furthermore, use of the model of the present invention does not involve any device for trainees to wear and is independent of other devices, making the model more convenient, versatile and compatible than any prior-art device, and highly promising in terms of future application.

Preferably, the processor is connected to at least one terminal in a wired or wireless manner. Specifically, the posture assessment module 400 is connected to at least one terminal through a cable or a wireless signal, so as to send the video data of the move images of the CPR provider and the arm-posture angle data and the GC matching angle data obtained through computing to a terminal. The terminal is used to display the move images, the arm-posture angle data, and the GC matching angle data of the CPR provider to at least one CPR expert. The terminal at least comprises a display component, an interaction component, and an information storage component. That is, the terminal is an electronic device capable of interaction. The terminal may be, for example, a tablet computer such as iPad, a laptop computer, a desktop computer, a smart phone, a smart watch, smart glasses or another electronic device having the same function.

Preferably, in the screen of the terminal, the arm-posture angle data and the GC matching angle data are such displayed that they do not overlap the displayed move of the CPR provider.

The terminal is to be operated by a CPR expert familiar to CPR operation standards. Preferably, one terminal is assigned to a CPR expert. Based on the principles of scientific statistics, it is preferable that the number of CPR experts is three and the move images of the CPR provider are for the three CPR experts to comment independently. The CPR experts make comments based on specified indicator contents. The indicator contents at least include straight arms and the corresponding indicator, as well as the GC matching angle and the corresponding indicator.

The indicator corresponding to straight arms is designed to be a criterion for determining whether the arm posture remains correct during the CPR operation. The indicator corresponding to the GC matching angle is designed to be a criterion for determining whether the travel direction of the center of gravity of the CPR provider remains perpendicular to the patient lying on the ground. As shown in FIG. 11, among the common CCP-related mistakes among CPR providers during operation, exerting force with wrists, finger-chest contact, GC deviation (including inclined simple GC bias, GC moving back and forth, and GC moving laterally), and bending elbows are the mistakes with the highest rates.

Therefore, the present invention further includes having CPR experts review and comment CPR moves in the CPR move images against predetermined comment indicators and excluding non-qualified data from subsequent analysis. The comment indicators at least include whether the arms are straight, and whether the GC location is correct.

The terminal sends the move images having comments from the CPR experts to the posture assessment module 400 through the second data transmission port of the processor.

The posture assessment module 400 receives the comment-attached move images, and takes the arm-posture angle data and the GC matching angle data of the CPR posture satisfying the criteria of the indicator contents, straight arms and the corresponding indicator, as well as the GC matching angle and the corresponding indicator, as qualified data. Preferably, when the move images collected by the collecting end are from an expert group composed of CPR experts, the arm-posture angle data and the GC matching angle data of the CPR posture satisfying the criteria of the individual indicators are recognized as expert-group qualified data. The expert-group qualified data are used as a dataset according to which CPR standards are formulated. The posture assessment module 400 receives the comment-attached move images, and take the arm-posture angle data and the GC matching angle data of the CPR posture not satisfying the criteria of the individual indicators as non-qualified data.

Figure 4:
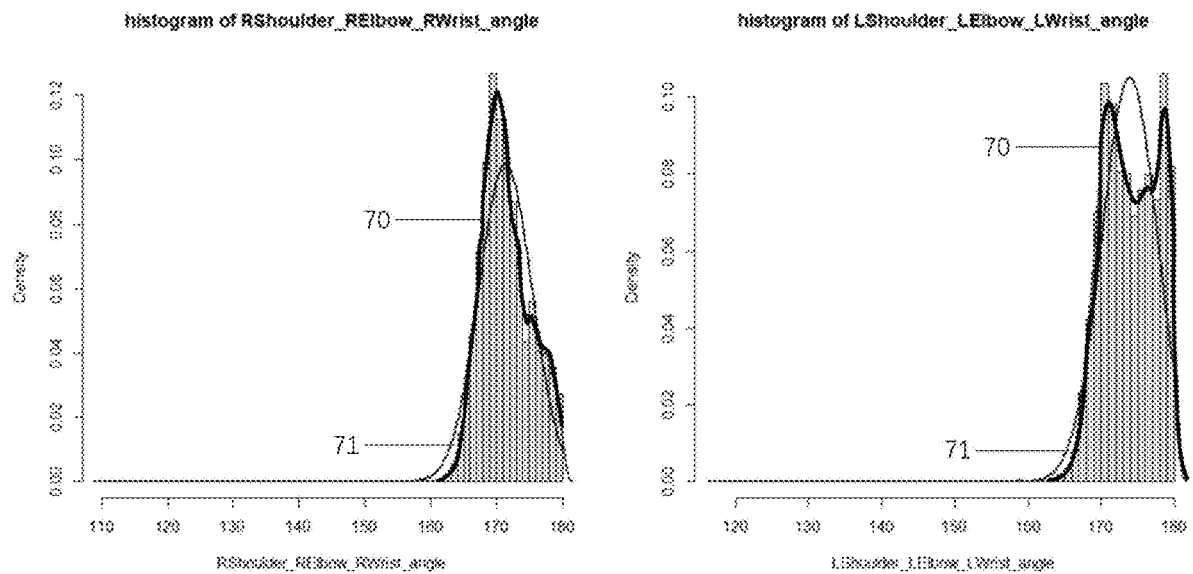
FIG. 4 provides histograms showing angular data of right and left arms of a CPR provider according to one embodiment of the present invention.
Figure 5:
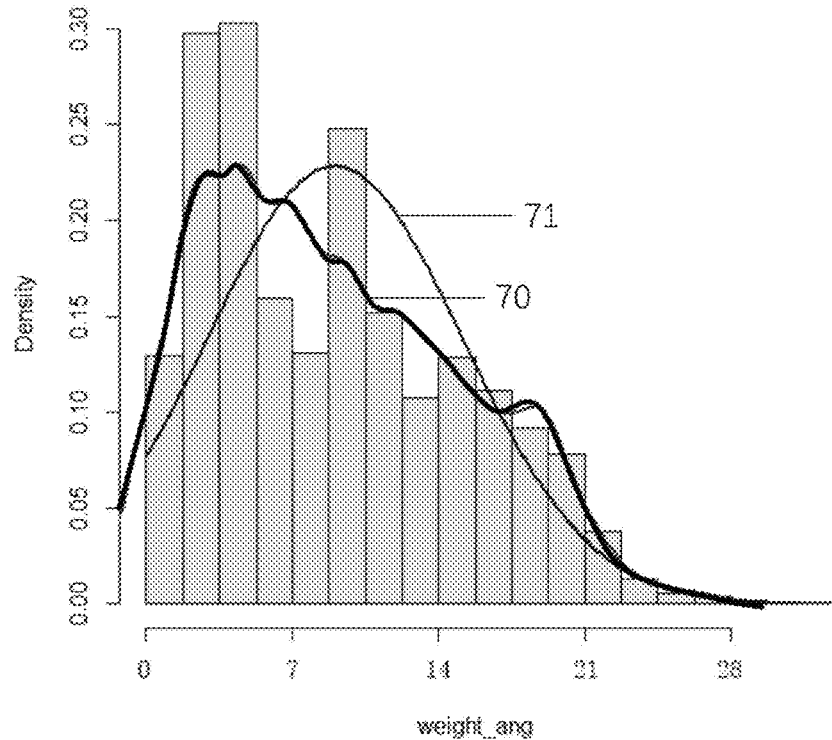
FIG. 5 provides a histogram showing data of a GC matching angle according to one embodiment of the present invention.

The posture assessment module 400 then compiles the screened-out expert-group qualified data. Specifically, as shown in FIG. 4, the collected expert-group qualified dataset contains 28800 sets of human skeleton point coordinate data, and the collected non-expert-group dataset contains 7200 sets of human skeleton point coordinate data. In FIG. 4 and FIG. 5, the thick curves represent the actual distribution curve 70 and the thin curves represent the normal distribution curve 71. As shown, the arm-posture angle data and the GC matching angle data both satisfy skewed distributions. For the arm-posture angle data, the 5th percentile is used as the normal value range, and for the GC matching angle data, the 95th percentile is used as the normal value range.

Specifically, all the measurement data are described in the form of "mean±standard deviation", and intergroup mean comparisons are conducted using independent sample t-test. Since data of the arm posture angle are of one-sided skewed distributions, the 5th to 10th percentile can be used to compute reasonable range. Similarly, data of the GC matching angle range are of one-sided skewed distributions, so the 90th to 95th percentile can be used to compute the reasonable range. All statistical works are done under two-sided 0.05 level of significance.

As shown in FIG. 6, with the 5th percentile taken, the reasonable range of the left arm posture angle is 169.24-180 degrees, and the reasonable range of the right arm posture angle is 168.49-180 degrees. With the 95th percentile taken, the reasonable range of the GC matching angle is 0-18.46. This is the CCP qualification threshold in the present invention.

Preferably, after the CCP qualification threshold is determined, a CPR automatic feedback assessment model is built.

Specifically, the posture assessment module 400 performs analysis and assessment on every move against the CCP qualification threshold automatically in a real-time manner. The assessment results include pass and fail. Therein, a complete round of compression is defined as a move. The collected CPR move images are segmented by complete moves, and the move data of all moves form a full dataset.

For example, 70% data in the full dataset are used to train the skeleton line segment algorithm in the posture assessment module 400 for building a CPR automatic feedback assessment model.

After the CPR automatic feedback assessment model is built, the remaining 30% data in the full dataset are used to test the CPR automatic feedback assessment model. According to the test result, the CPR automatic feedback assessment model of the present invention can accurately recognize postural mistakes during CPR operation.

The posture assessment module 400 sends, through at least one data transmission port, the assessment result of a complete move to a terminal for displaying the assessment result. The terminal receives the assessment result and displays the same on its screen. The assessment result may be expressed in the form of texts, images, symbols, colors, sounds, and any combination thereof.

FIG. 7 and FIG. 8 show the test results of the CPR posture monitoring model of the present invention. In particular, FIG. 7 shows assessment parameters used in the test, including: TP=962; FP=388; FN=238; and TN=5612, and FIG. 8 shows the test results for accuracy, sensitivity, and specificity of the CPR posture monitoring model. The data shown in FIG. 8 were obtained using equations:

$$\text{accuracy} = \frac{TP + TN}{TP + TN + FP + FN},$$
$$\text{Sensitivity} = \frac{TP}{TP + FN}, \text{ and}$$
$$\text{Specificity} = \frac{TN}{FP + TN}.$$

According to the test, the CPR automatic feedback assessment model of the present invention had accuracy of 91.31%; sensitivity of 80.16%; and specificity of 93.53%.

The posture angles of two arms and the GC matching angle are key points for assessing CPR posture, so the present invention quantifies their respective reasonable ranges as supplementary criteria for more objective and quantifiable postural assessment. The present invention thus enables CPR training where compression posture can be monitored in an objective, convenient, and real-time manner, so as to make CPR training more automated and standardized.

It is to be noted that the traditional CPR move assessment systems only cover postural data that can be directly detected or intuitively observed, such as the angles of two arms, and are unable to consider the GC shift trace and the force distribution between two arms of a CPR provider that are non-intuitive. When a person performs chest compression operation with his/her GC shifting improperly, the resulting uneven force distribution between his/her two arms can accelerate emergence of physical fatigue and reduce his/her persistence in prolonged CPR operation. As a result, the CPR operation can degrade in terms of strength and posture over time, endangering the success of first aid. In view of this problem, the CPR automatic feedback assessment model of the present invention determines a reasonable range of the GC matching angle as another objective indicator for postural correctness in addition to the angles of the two arms. When the angles of two arms and the GC matching angle are all within their respective reasonable ranges, it means that the CPR provider is operating CPR with even force distribution between arms and reasonable GC placement, which contribute to improved CPR persistence and enhanced first-aid effectiveness.

On top of that, in the present invention, the CPR automatic feedback assessment model monitors the posture angles of two arms and the GC matching angle so as to ensure that a triangle formed by: the line segment between the right shoulder 2 and the right wrist 4; the line segment between the left shoulder 5 and the left wrist 7 of the CPR provider; the line segment between the right shoulder 2 and the left shoulder 5; and extension lines of the three line segments is almost an isosceles triangle. The resulting balanced force distribution between the two arms of the CPR provider leads to even compression force, which defers emergence of fatigue and improves operating persistence, thereby ensuring good compression quality for a longer time period and significantly increasing the success rate of first aid.

Embodiment 2

The present embodiment relates to applications of the CPR posture monitoring model as described previously, and the details having been discussed in the first embodiment are not repeated herein.

Currently, CPR operation is conducted clinical applications without proper quality control, so the compression quality is inconsistent and unmeasurable, being adverse to success of resuscitation. The existing CPR quality control devices are mainly based on acceleration sensors, and need to be placed at the sternum of the patient. As these conventional devices are usually thick and hard, they may cause additional injury to the patients during compression, making it undesirable among patients and their family and unpromising for applicability. Correct compression posture is the ground for ensuring compression quality and preventing compression injury. However, the existing CPR quality control solutions for clinical applications can only measure compression in terms of depth and frequency, leaving compression posture as an untended part of CPR quality control.

It is the objective of the present invention to provide an apparatus that enables quality control of CPR moves in terms of compression quality and compression posture against preset indicators. The apparatus only uses camera components and eliminates the need of attaching any device on patients that may cause injury on the sternum during chest compression.

In the present invention, the CPR posture monitoring model may be installed and run in the CPR posture training apparatus or the CPR posture assessment apparatus, for guiding and/or assessing CPR moves of trainees, and for helping implementation of CPR moves.

Accordingly, an automatic CPR quality control system of the present invention at least comprises a first optical component, a second optical component, a manikin 120, and a processor. The processor comprises at least one data transmission port for data transmission. The first optical component, the second optical component, and the manikin are each in message transmission relation with the processor in a wired and/or wireless manner. The processor comprises posture assessment module 400 that runs a CPR posture monitoring model, a pre-processing module 300 that pre-processes data, and a data extraction module 200. The data transmission port of the processor may be in data transmission relation with the posture assessment module 400, the pre-processing module 300, and the data extraction module 200, respectively, so as to accomplish corresponding data transmission. The posture assessment module 400, the pre-processing module 300, and the data extraction module 200 are in data transmission relation successively in a wired or wireless manner, so as to achieve data transmission and receipt.

The first optical component and the second optical component collect move images of CPR moves from different collection directions simultaneously and send the move images to the processor. Preferably, the first optical component collects dynamic posture data of the CPR provider from the front of the CPR moves, or at the first angle. The second optical component collects dynamic posture data of the CPR provider synchronously from the lateral of the CPR moves, or at the second angle. The difference between the first angle and the second angle is 30-60 degrees. Preferably, the difference between the first angle and the second angle is 45 degrees.

Preferably, the manikin 120 is connected to the data transmission port of the processor in a wired and/or wireless manner, so as to send the collected compression measurement data to the processor. Preferably, the manikin 120 is in data connection with the pre-processing module 300 through a data transmission port.

The manikin 120 may be selected from various types. The manikin may be, for example, built therein an active actuator, a counterforce computing unit, a controller, and a chest depression sensor. The actuator is configured to generate counterforce in response to the compression applied to the manikin. The chest depression sensor sends the chest depression measurement to the controller. The counterforce computing unit computes the magnitude of the counterforce according to a preset function and the magnitude of the chest depression measurement. The active actuator may be a stand-alone rotary actuator. The controller sends the depression measurement and the compression frequency it receives from the depression sensor to the processor.

The pre-processing module 300 serves to receive the compression measurement data from the manikin during compression and pre-process the data. The compression measurement data at least include the compression depth and the compression frequency associated to time.

The pre-processing module 300 is further used to temporally align the move posture and the compression measurement data of the same complete move, thereby obtaining a dataset associated to this complete move.

Preferably, the pre-processor 300 does not align every complete move with the manikin compression data. Preferably, the pre-processor 300 aligns the compression data with the complete move data according to the compression tempo by which the manikin receives compression.

Specifically, the pre-processing module 300 takes the compression data collected when the manikin 120 is compressed to the deepest point as the first beat. At this time, the compression depth is at the maximum value.

The pre-processing module 300 takes the compression data collected when the compression is about to end and the manikin 120 is compressed to the deepest point as the last beat. The time from the first beat to the last beat is the time period for which the pre-processing module 300 needs to compute the move data corresponding to the compression data.

In the present invention, alignment between the move data and the compression data is made according to a time period but not for every individual move, and this effectively reduces workloads for computing and processing data to be aligned.

Where a manikin is used, the general dataset that are successfully recognized by a neural network model installed in the posture assessment module 400 includes not only the dataset for complete moves, but also compression data corresponding to every complete move. In the present embodiment, seventy percent of the general dataset containing the dataset for compression data and moves, as well as the CPR compression qualification threshold, and the qualification threshold for compression data was sent to the neural network model for training, so as to obtain a posture monitoring model.

Thirty percent of the general dataset was input to the posture monitoring model of the posture assessment module 400 for testing, so as to obtain the test result of the posture monitoring model. The posture monitoring model has accuracy of 91.31%, sensitivity of 80.16%, and specificity of 93.53%.

In practical applications, when the compression depth, the compression frequency, the left-arm posture angle, the right-arm posture angle, and the GC matching angle are all within their respective reasonable ranges, the posture assessment module 400 outputs a quality control result indicating "pass" to the terminal. Otherwise, the posture assessment module 400 outputs a quality control result indicating "fail" to the terminal.

The quality control results indicating "pass" and "fail" may be displayed in the form of texts, patterns and/or voice messages.

Preferably, the posture assessment module 400 further sends an auxiliary message specific to the CPR move to the terminal in a real-time manner. The auxiliary message may be presented acoustically with the contents of, for example, "straighten your left arm", "straighten your right arm", "move your GC to the left", "move your GC to the right", etc.

Preferably, the auxiliary message may be presented visually. The posture assessment module 400 further inform the terminal of the difference between the move image of the current CPR posture and the standard CPR posture in a real-time manner, so as to help the CPR provider adjust his/her CPR posture.

As to clinical CPR quality control, the existing approaches are unsatisfying yet complicated, and are unable to provide comprehensive assessment, making them unpromising for applicability. By comparison, the CPR automatic quality control system of the present invention achieves comprehensive quality control that covers all key indicators for compression quality and posture using merely cameras without using any auxiliary quality control device, so the disclosed system is highly adaptive and more promising for clinical applications.

Embodiment 3

The present embodiment relates to an optimization apparatus and an optimization method for a CPR posture monitoring model. The optimization apparatus at least comprises an optimization module 500.

The mark-based optical move capturing technology features accuracy of moving point data it collects. However, it is highly demanding in sampling conditions, so the data acquisition is relatively difficult. Data collected using ZED2 camera tend to be influenced by ambient lighting and clothing of the subjects, so the accuracy is problematic. Differently, in the present invention, 3D moving point data are projected to the viewpoint at which a ZED2 camera collects data, and accurate moving point data are used to improve the move assessment model in accuracy, thereby improving the overall model accuracy. Also, assessment of CPR moves can be performed more accurately without using moving point data.

First, a high-accuracy CPR posture calibration model is built based on the 3D moving point data.

The collecting end 100 has a mark-based optical move capturing camera. The mark-based optical move capturing camera may be, for example, an Optitrack device, which is configured to operate according to a Motive program.

The CPR provider as the object for the mark-based optical move capturing camera to shoot is a CPR expert. The moving point data of CPR moves of the CPR expert are collected and used to generate high-accuracy, standard, 3D CPR posture moving point data.

The optimization module 500 may be an application-specific integrated chip and/or a CPU capable of running the optimization steps. The optimization module 500 is equipped with at least one data transmission port.

Preferably, optimization module 500 is connected to the moving point data collect component in a wired and/or wireless manner. The moving point data collect device is preferably a mark-based optical move capturing component.

The optimization module 500 at least comprises a 2D posture estimation sub-unit 92, a 3D moving point sub-unit 93, and a united optimization unit 94. The 3D moving point sub-unit 93 and the 2D posture estimation sub-unit 92 are in data transmission relation with the united optimization unit 94, respectively.

The 3D moving point sub-unit 93 serves to convert the moving point data obtained through marking into data of the same viewpoint where video is shot for deep-learning training, so as to generate a posture detection calibration model.

The 2D posture estimation sub-unit 92 performs data cleaning on the collected video of the two collection directions and then uses Alphapose for human posture estimation. Afterward, data cleaning is performed again. The cleaned data are used for deep-learning training, so as to generate an initial posture monitoring model.

Alternatively, the 2D posture estimation sub-unit 92 may be replaced by the posture assessment module 400. In other words, the processor is in data transmission relation with the optimization module 500 through a data transmission port, so that the posture assessment module 400 can send the human posture estimation data and the initial posture monitoring model to the optimization module 500.

The united optimization unit 94 analyzes the data distributions of the 3D moving point sub-unit 93 and the 2D posture estimation sub-unit 92 as well as the training results, and improves the initial posture monitoring model based on the moving point data, so as to generate an optimized posture monitoring model.

Figure 13:
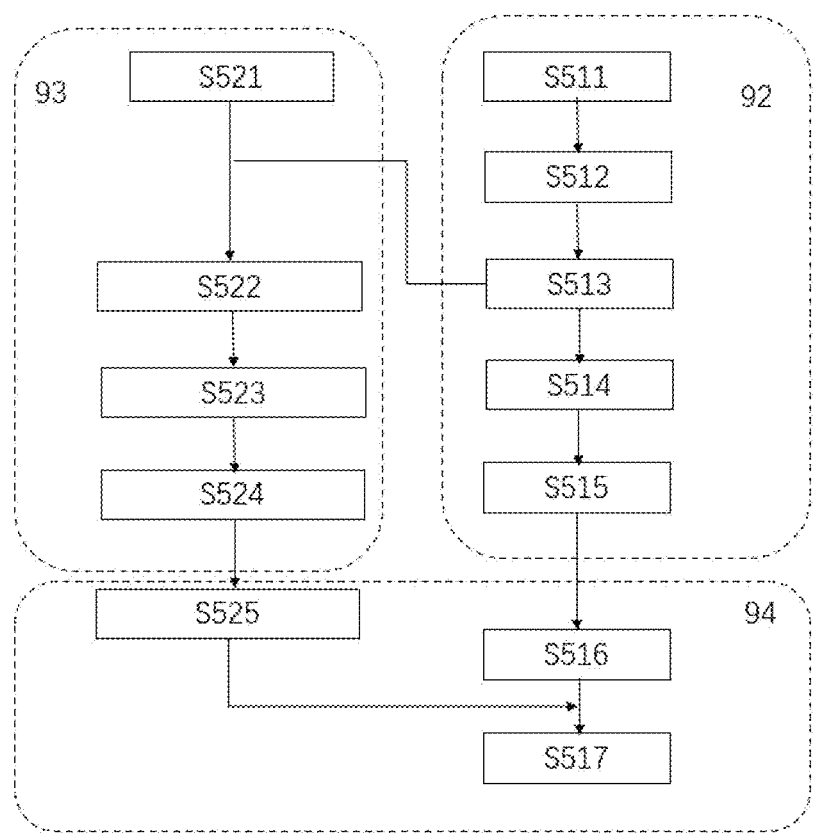
FIG. 13 is a logic diagram of an optimization process conducted by an optimization module according to one embodiment of the present invention.

Specifically, as shown in FIG. 13, the 2D posture estimation sub-unit 92 processes data through at least the following steps:

S511: receiving video data related to CPR moves;
S512: performing first data cleaning;
S513: performing 2D human posture estimation and obtaining 2D human posture data;
S514: performing second data cleaning on the 2D human posture data;
S515: performing training and classification on the 2D human posture data after second cleaning using a machine learning model; and
S516: obtaining the initial posture monitoring model.

According to one example, in the 2D posture estimation sub-unit, the video data first received useless frame cleaning, and 2D human posture estimation was made based on the video data from two viewpoints by means of Alphapose. Since the collected data contained cluttered backgrounds and irrelevant characters hard to remove completely, the estimated human joint point data contained many noises data, so the estimated human joint point data were cleaned again. The eventually obtained data were input to a deep-learning classification model for training.

For example, from the video data collected by the cameras, useless frames at the beginning and the end were deleted and the video data were subject to the Alphapose algorithm for human posture estimation. Due to backgrounds and lighting, the estimated posture data still contained noise and thus were cleaned again. After cleaning, 27090 sets of front-viewpoint data and 53670 sets of lateral-viewpoint data were obtained.

As shown in FIG. 13, the 3D moving point sub-unit 93 processed the data through at least the following steps:

S521: receiving or calling the 3D moving point data, and receiving 2D human posture data;
S522: based on the received 2D human posture data, converting the moving point data obtained through marking into 2D view data having the same viewpoint as the viewpoint of the collected video;
S523: performing data cleaning on the 2D view data;
S524: performing training and classification on the cleaned 2D view data using a machine learning model;
S525: obtaining a posture detection calibration model.

Then, the united optimization unit 94 perform a step S517.

At S517, the initial posture monitoring model and the posture detection calibration model were compared and analyzed, so that error data were removed based on the moving point data.

For example, the received moving point data, after deletion of data related to the useless moves at the beginning and at the end, had 83458 sets of 3D coordinate data, and the data were converted into a pixel coordinate system, so as to obtain 83458 sets of front-viewpoint data and 83458 sets of lateral-viewpoint data.

The moving point data obtained through marking were converted to 2D view data having the same viewpoint of the collected video according to the principle detailed below.

Figure 14:
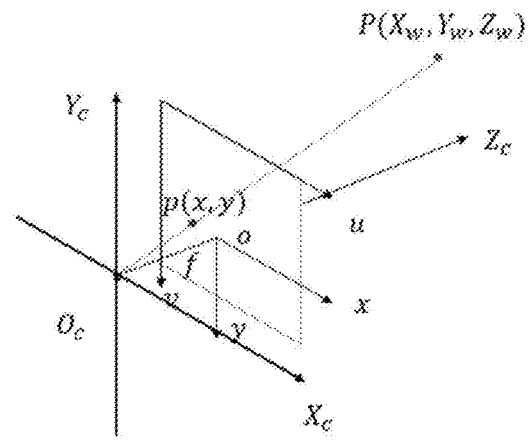
FIG. 14 is a schematic drawing of dual-stereo-camera imaging according to one embodiment of the present invention.

The 3D data collected using the moving points were converted to the viewpoints at which the two camera collected data. Since placement of the cameras was not angularly perfect, it was infeasible to do computing with the front viewpoint and the 45° lateral viewpoint directly. As shown in FIG. 14, in the present invention, the accurate 3D coordinate points collected at the moving points are deemed as 3D points in the world coordinate system, and posture key points obtained through estimation from the collected video are deemed as 2D points as projections of the 3D points on the image. Therefore, the transformation matrix between the two coordinate systems has to be ascertained. In order to determine the relation between the three-dimensional geometrical location of some point on the surface of the human body and its corresponding point in the image, it is necessary to build a camera imaging geometrical model. These geometrical model parameters are internal and external parameters of the cameras.

As shown below, conversion from the world coordinate system to the camera coordinate system is rigid transformation. The 3D data collected at the moving point are deemed as points $(X_W, Y_W, Z_W)$ in the world coordinate system. First, the cameras are marked to obtain the corresponding translation matrix and rotation matrix, namely the external parameters of the cameras. In the present invention, conversion between two coordinate systems may be expressed in the form of a matrix, and after conversion, points $(X_C, Y_C, Z_C)$ in the camera coordinate system can be obtained.

$$\begin{bmatrix} X_c \\ Y_c \\ Z_c \end{bmatrix} = R \begin{bmatrix} X_w \\ Y_w \\ Z_w \end{bmatrix} + T$$

After the moving point data are converted from the world coordinate system to the camera coordinate system, further conversion is made toward a 2D posture estimation subsystem to obtain the pixel coordinate system of the data, thereby achieving alignment of the coordinate systems. Conversion from a camera coordinate system to an image physical coordinate system represents a perspective relation. In practical use, similarity of triangles is used for computing. Conversion from an image physical coordinate system to a pixel coordinate system is discretization of coordinates. The overall conversion of the final moving point data is shown below, achieving coordinate alignment between the two sub-systems:

$$Zc \begin{bmatrix} u \\ v \\ 1 \end{bmatrix} = \begin{bmatrix} \frac{1}{dx} & y & u0 \\ 0 & \frac{1}{dy} & v0 \\ 0 & 0 & 1 \end{bmatrix} * \begin{bmatrix} f & 0 & 0 \\ 0 & f & 0 \\ 0 & 0 & 1 \end{bmatrix} * [R \mid T] * \begin{bmatrix} X_w \\ Y_w \\ Z_w \\ 1 \end{bmatrix}$$

From video posture estimation, relatively reliable data are selected to match joint coordinates corresponding to the moving points, thereby obtaining internal and external camera parameters, and converting coordinates in the world coordinate system to points in the pixel coordinate system. The moving point data eventually obtained after the foregoing conversion are consistent to video posture estimation collected by the cameras in terms of data viewpoint.

The optimization module 500 of the present invention is effective in improving accuracy of the CPR qualification threshold.

Figure 15:
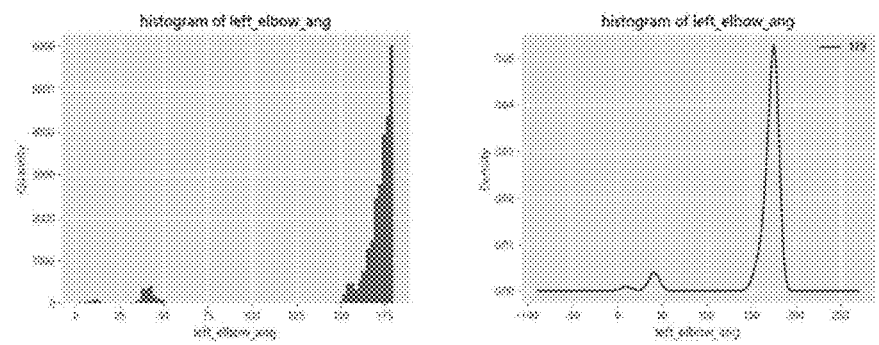
FIG. 15 provides a histogram and a kernel density map of the left-arm posture angle.
Figure 16:
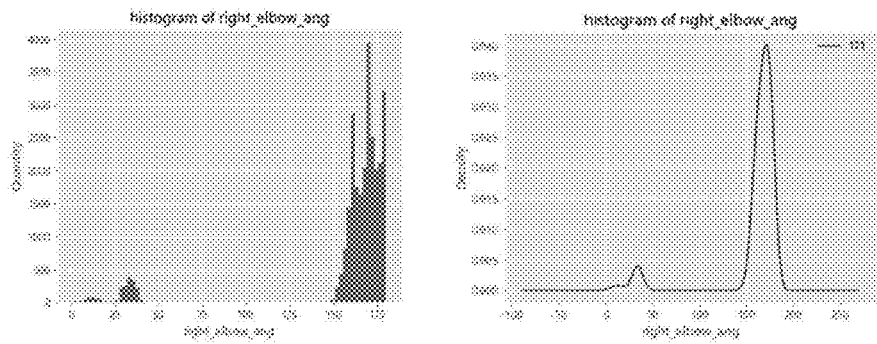
FIG. 16 provides a histogram and a kernel density map of the right-arm posture angle.
Figure 17:
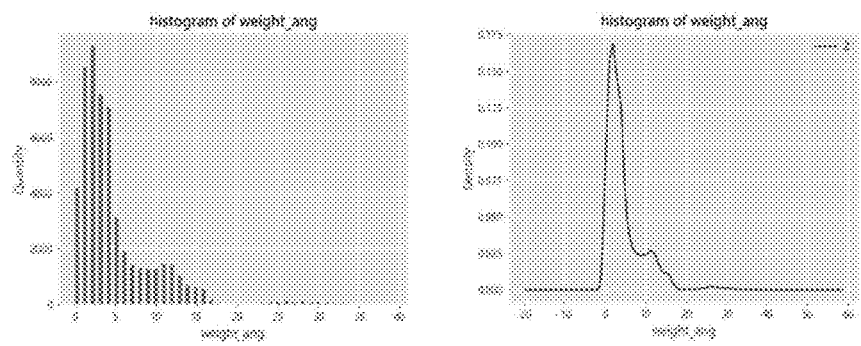
FIG. 17 provides a histogram and a kernel density map of the GC matching angle.

Data collected by the cameras collect may have poor quality and low accuracy, and the distribution of sample data may be unbalanced. When the number of non-standard samples is too small, the model is prevented from learning non-standard moves well, so the share of negative samples in increased to allow the deep-learning algorithm to learn better. Thus, for the posture angle thresholds of two arms, the 80% data close to the standard 180° arms posture angle are taken as the standard data, and the remaining 20% are taken as non-standard data. For the GC matching angle threshold, the 80% data close to the standard 0° GC matching angle are taken as standard data, and the remaining 20% data are taken as non-standard data. In the arm posture angle of the data collected by cameras in an example, the left arm posture angle histogram and the kernel density map are shown in FIG. 15. The right-arm posture angle histogram and the kernel density map are shown in FIG. 16. The GC matching angle histogram and the kernel density map are shown in FIG. 17. As shown in FIG. 15, the left arm posture angle data are mainly in the range of 150-180°. The corresponding kernel density map also shows that the left arm angle data are mainly in the range of 150-180°. The right-arm posture angle histogram and the kernel density map are shown in FIG. 16. The right arm posture angle data are mainly in the range of 150-180°. The corresponding kernel density map also shows that the right-arm posture angle is mainly in the range of 150-180°. The GC matching angle histogram and the kernel density map are shown in FIG. 17. The GC matching angle data are mainly in the range of 0-18°. The corresponding kernel density map also shows that the GC matching angle are mainly in the range of 0-18°.

Preferably, after optimized by the optimization module 500, the posture monitoring model showed improvements in accuracy, sensitivity, and specificity.

First, the move data from the video collected by the cameras were directly introduced into the posture monitoring model for training. For assessment of the arm bending angle, the front dataset was used for training. The general dataset contained 27090 sets of samples. Therein, 70% ware put into a training set, and the remaining 30% were put into a testing set. The assessment results are shown in Table 1, and the testing set performance in terms of accuracy and other is shown in Table 2.

TABLE 1

Arm assessment parameter statistics

| Parameter | Meaning | Count (set) |
|---|---|---|
| TP | Estimated as positive, actually positive | 1672 |
| FP | Estimated as positive, actually negative | 256 |
| FN | Estimated as negative, actually positive | 36 |
| TN | Estimated as negative, actually negative | 6163 |

TABLE 2

Testing set accuracy, sensitivity, specificity

| Parameter | Value |
|---|---|
| Accuracy | 96.41% |
| Sensitivity | 97.89% |
| Specificity | 96.01% |

For assessment of the GC matching angle, the lateral dataset was used for training. The general dataset contained 53670 sets of samples. Therein, 70% ware put into a training set, and the remaining 30% were put into another testing set. The assessment results are shown in Table 3, and the testing set performance in terms of accuracy and other is shown in Table 4.

TABLE 3

GC assessment parameter statistics

| Parameter | Meaning | Count (set) |
|---|---|---|
| TP | Estimated as positive, actually positive | 3146 |
| FP | Estimated as positive, actually negative | 222 |
| FN | Estimated as negative, actually positive | 36 |
| TN | Estimated as negative, actually negative | 12697 |

TABLE 4

Testing set accuracy, sensitivity, specificity

| Parameter | Value |
|---|---|
| Accuracy | 98.40% |
| Sensitivity | 98.87% |
| Specificity | 98.28% |

According to Table 1 and Table 3, TP data and TN data increased significantly.

According to Table 2 and Table 4, accuracy, sensitivity and specificity achieved by the testing set were all higher than 95%.

The united optimization unit in the optimization module 500 of the present invention accomplishes optimization on the principles explained below.

Moving point data are accurate but difficult to acquire. On the other hand, video data collected using cameras are advantageous for low costs but are less accurate. In addition, backgrounds in the video captured by cameras can be noise that leads to recognition mistakes of the human posture estimation algorithm. The present invention thus can use the moving point data to improve the posture estimation data training model, and the improved model can work directly with video data, without needing moving point data that are difficult to acquire.

Figure 18:
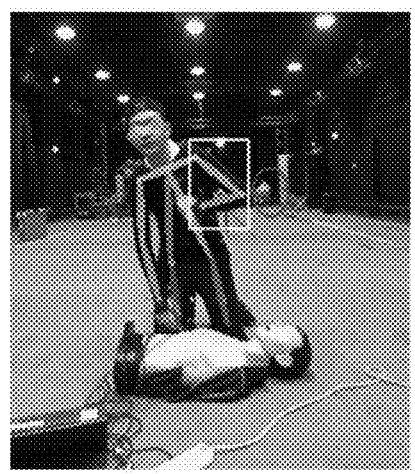
FIG. 18 illustrates examples of "unreasonable" data according to one embodiment of the present invention.

The inventors of the present invention found in data distribution analysis, by comparing distributions of moving point data and distributions of video data, that the low accuracy of the camera-based data assessment model was mainly caused by "error data" contained in its input. It was hard to tell whether the "error data" were caused by errors in the posture estimation algorithm or by wrong performance of the person performing CPR moves according to merely the data obtained from video. However, accurate moving point data distributions taught the fact that some angles can never been seen in any move made by a CPR demonstrator. The data acquired from video can introduce some "unreasonable" data into the model, and the "unreasonable" data can disturb the training of the model. As shown in FIG. 18, the object in the grey circle is background noise existing in that frame, and was removed during posture data cleaning after human posture estimation, but in the white box, the object behind the CPR provider was wrongly recognized as a part of human posture and preserved. Before improvement, when the data were introduced into the model, the model was unable to correctly understand this object and sometimes recognized it as a part of a standard move. After improvement, the same object was recognized as an "unreasonable" data. To be specific, on the basis of the data distributions of the moving points, it was found that such an elbow angle could never been seen on a CPR demonstrator.

Figure 19:
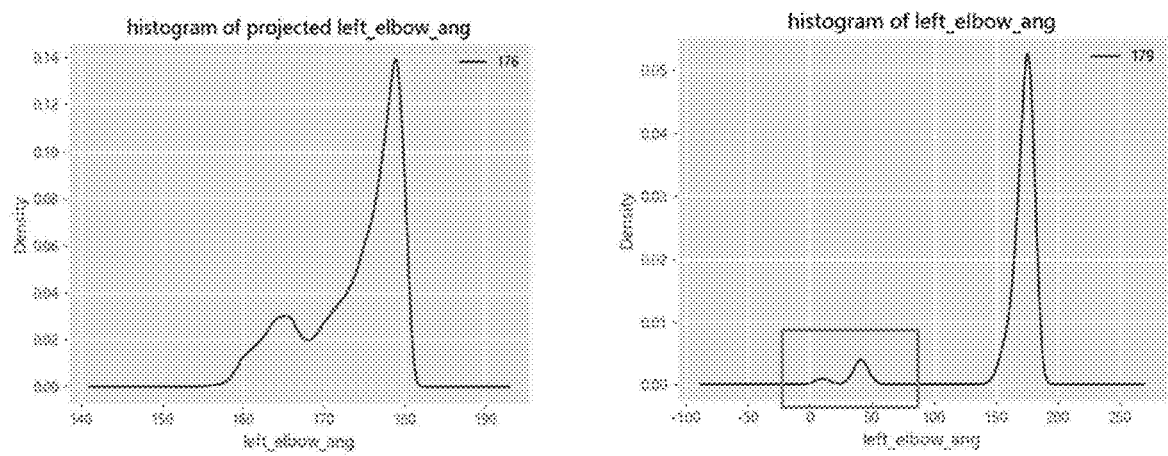
FIG. 19 provides comparison of left-arm posture angle data distributions according to the present invention.

As shown in FIG. 19, the left is the left-arm posture angle distribution of the moving point data, and the right is the left-arm posture angle distribution of the video estimation data. The data in the grey box are "unreasonable" data. As can be observed from the kernel density image at the left, the accurate moving point data shows that there is not any left arm posture angle of a CPR demonstrator smaller than 140°. Nevertheless, the data obtained through human posture estimation did contain some data ranging between 0° and 100°. As the differences are huge, it is believable that occurrence of such deviations was caused by errors, not inaccuracy. It might be the case that when human posture estimation was performed with this frame of the video, the estimation was impacted by the background or mistakes happened in posture recognition, and the data related to the mistakes should be removed.

Figure 20:
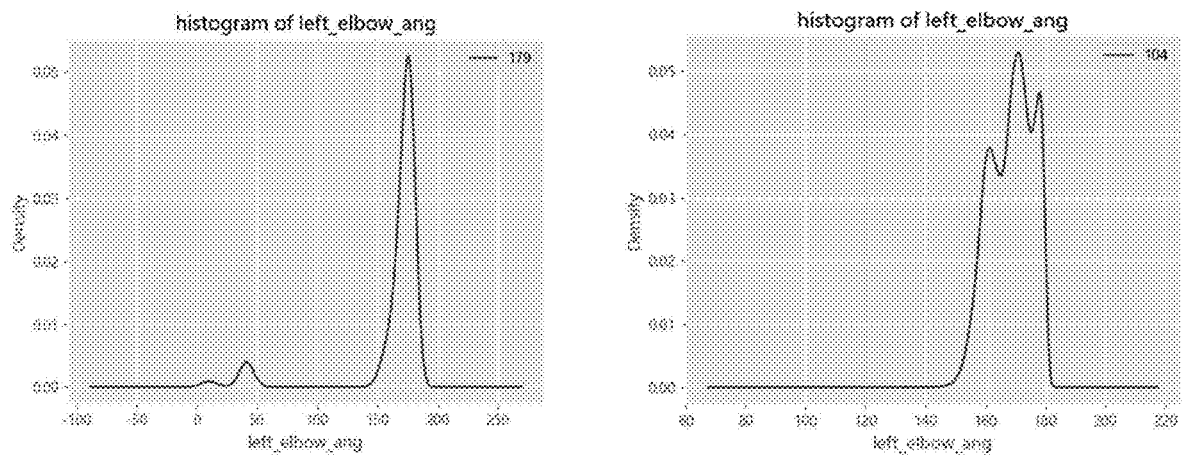
FIG. 20 provides comparison of data distributions before and after removal of error data according to the present invention.

In FIG. 20, the left is the kernel density map of the left arm posture angle data containing error data, and the right is the kernel density map of the left arm posture angle data with error data removed. The left arm posture angle distribution of the video estimation data after the error data were removed is at the right in FIG. 20. At this time, the data distribution conforms to the CPR move angle range, and is roughly the same as the accurate moving point data angle distribution range.

The presence of "unreasonable" data can confuse the model during learning by preventing the model from really learning unqualified moves. After the error data were removed, the number of data sets decreased from 27090 to 25103, and the data with a distribution within a reasonable range were then introduced into the assessment model for training, thereby improving the model performance. The training results obtained by using the front data for assessment of the arm posture angle are summarized in Table 5. The assessment model had its accuracy increased to 97.03% from 96.41% of the model not improved using the moving point data whose testing results are shown in Table 2. Hence, the improved assessment model can better determine whether the CPR moves are qualified.

TABLE 5

Arm assessment parameter statistics after improvement

| Parameter | Meaning | Count (set) |
| --- | --- | --- |
| TP | Estimated as positive, actually positive | 2211 |
| FP | Estimated as positive, actually negative | 179 |
| FN | Estimated as negative, actually positive | 45 |
| TN | Estimated as negative, actually negative | 5096 |

TABLE 6

Testing set accuracy comparison before and after improvement

| | Data Volume | Accuracy |
| --- | --- | --- |
| Before Improvement | 27090 | 96.41% |
| After Improvement | 25103 | 97.03% |

Figure 21:
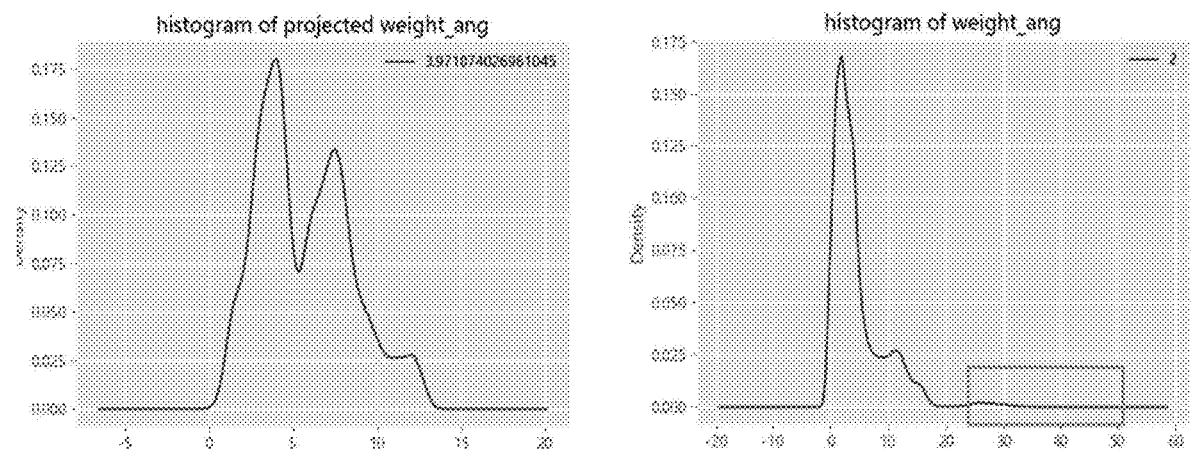
FIG. 21 provides comparison of data distributions of the GC matching angle before and after optimization conducted by the optimization module according to the present invention.

The lateral data were processed similarly. In FIG. 21, the left is the kernel density map made with the pre-optimization lateral data, and the right is the kernel density map made with the post-optimization lateral data. Through comparison it is clear that the accurate moving point data indicate that a GC matching angle greater than 20° did not exist. As shown in the grey box, there are a few data points of the GC matching angle of the estimated video data greater than 30°, and these data have adverse impact on the quality of the CPR assessment model.

Figure 22:
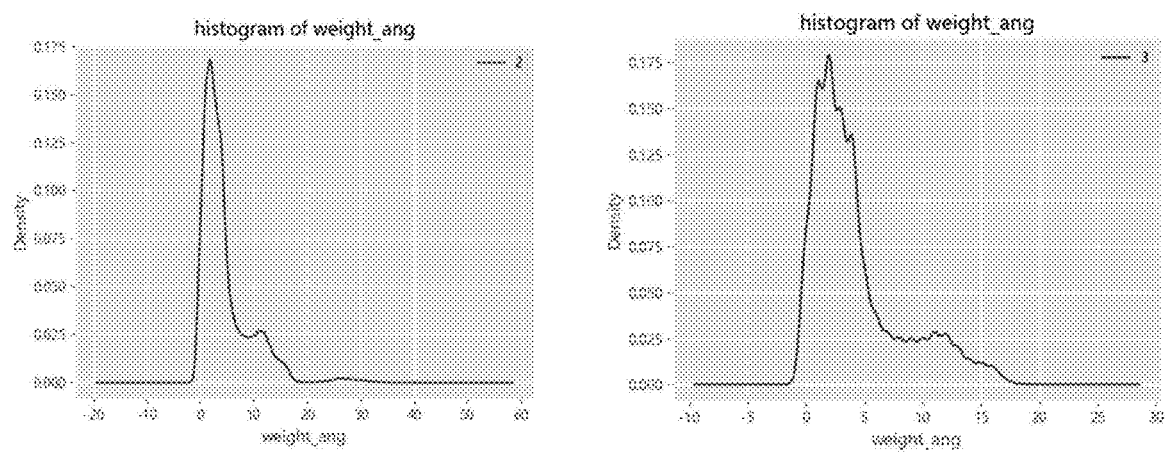
FIG. 22 provides comparison of data distributions before and after optimization conducted by the optimization module and before and after removal of error data according to the present invention.

The GC matching angle distribution of the video estimation data containing error data is shown in the left part in FIG. 22, and the GC matching angle distribution of the video estimation data with error data removed is shown in the right part in FIG. 22. At this time, the data distribution conforms to the CPR move angle range, and is roughly the same as the accurate moving point data angle distribution range.

After the error data were removed, as shown in FIG. 21, the number of data sets of the lateral data decreased from 53670 to 52882, and the data with a distribution within a reasonable range were then introduced into the assessment model for training, thereby improving the model performance. Now, as shown in Table 7, the assessment model had its accuracy increased to 98.77% from 98.40% of the model not improved using the moving point data whose testing results are shown in Table 4. Hence, the improved assessment model can better determine whether the CPR moves are qualified.

TABLE 7

GC assessment parameter statistics after improvement

| Parameter | Meaning | Count (set) |
|---|---|---|
| TP | Estimated as positive, actually positive | 3947 |
| FP | Estimated as positive, actually negative | 174 |
| FN | Estimated as negative, actually positive | 21 |
| TN | Estimated as negative, actually negative | 11723 |

TABLE 8

Testing set accuracy comparison before and after improvement

| | Data Volume | Accuracy |
|---|---|---|
| Before Improvement | 53670 | 98.40% |
| After Improvement | 52882 | 98.77% |

From the results provided above it is clear that after removal of the data of the arm joint posture angle and the GC posture angle with unreasonable distributions, the assessment model showed obvious improvements in tests. This proves the feasibility of using the moving point data to help improve the camera-based move assessment model. The improved model can be used directly without the need of collecting moving point data for analysis.

Collection of moving point data requires high costs and is demanding in sampling conditions, making it less accessible. On the other hand, video data collected using cameras are advantageous for easy aquation but are less accurate because they tend to be impacted by backgrounds and lighting. To address the dilemma, the present invention employs an optimization module to conduct conversion between coordinate systems and then align moving point data with video move data collected by cameras. Based on distributions of accurate moving point data and common knowledge about CPR moves, the quality of move video data can be further improved, thereby eventually improving the move assessment model in terms of accuracy. The trained model can be directly applied to video data collected in other scenes without assistance of moving point data, to provide more accurate move assessment.

It is to be noted that the embodiments described above are exemplificative. Various solutions are apparent to people skilled in the art with the enlightenment of the present disclosure, and all those solutions form a part of the disclosure of the present invention as they all fall within the scope of the present invention. It is thus to be understood by people skilled in the art that the description and accompanying drawings provided by the present invention are only illustrative but not limiting to claims of the present application. The scope of the present invention shall be defined by the claims and their equivalents. The description of the present invention contains a number of inventive concepts, such as "preferably", "according to a preferred embodiment" or "optionally" all indicate that the corresponding paragraph discloses an independent idea, and the applicant reserves the right to file a divisional application based on each of the inventive concepts.

What is claimed is:

1. An automatic cardiopulmonary resuscitation (CPR) quality control system, at least comprising:

a collecting end, a processor, and at least one terminal, the collecting end being in wired or wireless connection to the processor for data transmission, and the processor being connected to the at least one terminal for data transmission;

wherein the processor performs automatic detection quality control behavior based on a CPR automatic feedback assessment model;

wherein the collecting end comprises a first optical component and second optical component wherein the first and second optical components are configured to simultaneously, collect move data related to CPR moves of a CPR provider in different collection directions, and an included angle between the collection directions ranges between 30 and 90 degrees;

wherein the processor computes arm posture angle data and center of gravity (GC) matching angle data based on human skeleton point data extracted from the CPR moves performed by the CPR provider, and determines whether the arm posture angle data and GC matching angle data are qualified against a chest compression posture (CPP) qualification threshold;

wherein the at least one terminal is configured to receive a message sent by the processor indicating that the CPR moves are qualified;

wherein the GC matching angle data relates to a GC matching angle, which is an included angle between a travel direction of a center of gravity of the CPR provider and a direction perpendicular to a patient, wherein a midpoint A of a first link between a right shoulder and a left shoulder of the CPR provider moves toward a midpoint B of a second link between a right wrist and a left wrist of the CPR provider, generating a vector AB, the included angle between the vector AB, and a plane normal vector being the GC matching angle;

wherein the arm posture angle data relates to an arm posture angle defined by links between human skeleton points respectively corresponding to a shoulder, an elbow joint and a wrist of the CPR provider;

wherein according to the human skeleton point data collected by the first optical component, arm posture angle data can be generated, and according to the human skeleton point data collected by the second optical component, GC matching angle data can be generated;

wherein the system also comprises an optimization module for performing motion evaluation and calibration, the optimization module at least comprising a 2D posture estimation sub-unit, a 3D moving point sub-unit, and a united optimization unit;

wherein the 3D moving point sub-unit converts 3D moving point data obtained through marking into data of a same viewpoint where video is shot for deep-learning training, so as to generate a posture detection calibration model;

wherein the 2D posture estimation sub-unit performs data cleaning on collected video of the collection directions, then uses Alphaphose for human posture estimation, then performs data cleaning a second time;

wherein the 3D moving point sub-unit processes data through at least the following steps:
receiving or calling the 3D moving point data and receiving 2D human posture data;
based on the received 2D human posture data, converting the 3D moving point data obtained through marking into 2D view data having the same viewpoint as the collected video;
performing data cleaning on the 2D view data;
performing training and classification on the 2D view data using a machine learning model; and
obtaining the posture detection calibration model:
wherein the processor feeds back to the at least one terminal information based on a determination of whether the arm posture angle data of the CPR moves and the GC matching angle data are qualified against the CCP qualification threshold;
wherein the CCP qualification threshold at least includes a reasonable left arm angle range of between 169.24° and 180°, a reasonable right arm angle range of between 168.49° and 180°, and a reasonable GC matching angle range of between 0° and 18.46°; and
wherein the CCP qualification threshold is determined by:
determining a reasonable range of the arm posture angle data and a reasonable range of the GC matching angle data according to one-sided skewed distribution patterns of arm posture angle data and GC matching angle data of plural qualified CPR moves;
determining the reasonable range of the arm posture angle data based on a 5th percentile in a one-sided skewed distribution pattern of the arm posture angle data; and
determining the reasonable range of the GC matching angle data based on a 95th percentile in a one-sided skewed distribution pattern of the GC matching angle data.

2. The automatic CPR quality control system of claim 1, wherein the first optical component collects the first move data at a collection direction of 0 degrees with respect to the front of the CPR provider,
wherein the second optical component collects the second move data at a collection direction of 45 degrees laterally with respect to the front of the CPR provider,
wherein the processor, according to the skeleton point data collected by the first optical component, generates the arm posture angle data, and
wherein the processor, according to the skeleton point data collected by the second optical component, generates the GC matching angle data.

3. The automatic CPR quality control system of claim 2, wherein the included angle between the collection directions of the first and second optical components is 45 degrees.

4. The automatic CPR quality control system of claim 3, wherein when the automatic CPR quality control system receives compression data fed back by a manikin about the CPR moves, and the compression data are in temporal alignment with the CPR moves, the processor determines whether the CPR moves are qualified according to the CCP qualification threshold, and sends one or both of indicator-based comments made by at least one CPR expert on the CPR moves, or a CCP qualification threshold and move-quality related comments about the CPR moves to the at least one terminal.

5. An automatic cardiopulmonary resuscitation (CPR) quality control method, at least comprising:
capturing images of CPR move data of CPR moves from different angles simultaneously;
computing arm posture angle data and center of gravity (GC) matching angle data based on human skeleton point data extracted from the CPR moves and a CPR automatic feedback assessment model, and determining whether the arm posture angle data and the GC matching angle data are qualified against a chest compression posture (CPP) qualification threshold;
wherein the GC matching angle data relates to a GC matching angle, which is an included angle between a travel direction of a center of gravity of the CPR provider and a direction perpendicular to a patient, wherein a midpoint A of a first link between a right shoulder and a left shoulder of the CPR provider moves toward a midpoint B of a second link between a right wrist and a left wrist of the CPR provider, generating a vector $\overline{AB}$, the included angle between the vector $\overline{AB}$ and a plane normal vector being the GC matching angle;
wherein the arm posture angle data relates to an arm posture angle defined by links between human skeleton points respectively corresponding to a shoulder, an elbow joint and a wrist of the CPR provider; and
wherein according to the human skeleton point data collected by the first optical component, arm posture angle data can be generated, and according to the human skeleton point data collected by the second optical component, GC matching angle data can be generated;
performing motion evaluation and calibration;
converting 3D moving point data obtained through marking into data of a same viewpoint where video is shot for deep-learning training, so as to generate a posture detection calibration model;
performing data cleaning on collected video of the collection directions and then using Alphaphose for human posture estimation, then performing data cleaning a second time;
wherein converting moving point data obtained through marking into data of a same viewpoint as a collected video for deep-learning training, so as to generate a posture detection calibration model, comprises at least the following steps:
receiving or calling the 3D moving point data and receiving 2D human posture data;
based on the received 2D human posture data, converting the 3D moving point data obtained through marking into 2D view data having the same viewpoint as the collected video;
performing data cleaning on the 2D view data;
performing training and classification on the 2D view data using a machine learning model;
and obtaining the posture detection calibration model;
feeding back to at least one terminal information based on a determination of whether the arm posture angle data of the CPR moves and the GC matching angle data are qualified against the CCP qualification threshold;
wherein the CCP qualification threshold at least includes a reasonable left arm angle range of between 169.24° and 180°, a reasonable right arm angle range of between 168.49° and 180°, and a reasonable GC matching angle range of between 0° and 18.46°; and
wherein the CCP qualification threshold is determined by:
determining a reasonable range of the arm posture angle data and a reasonable range of the GC matching angle data according to one-sided skewed distribution patterns of arm posture angle data and GC matching angle data of plural qualified CPR moves;

determining the reasonable range of the arm posture angle data based on a 5th percentile in a one-sided skewed distribution pattern of the arm posture angle data; and determining the reasonable range of the GC matching angle data based on a 95th percentile in a one-sided skewed distribution pattern of the GC matching angle data.

6. The method of claim 5, wherein one of the optical components collects the move data at a collection direction of 0 degrees with respect to the front of the CPR provider, and wherein an included angle between the collection directions of the first optical component and the second optical component ranges between 30 and 90 degrees.

* * * * *